United States Patent [19]

Horie et al.

[11] Patent Number: 5,356,748
[45] Date of Patent: Oct. 18, 1994

[54] LIQUID DEVELOPER FOR ELECTROSTATIC PHOTOGRAPHY

[75] Inventors: Seiji Horie; Kenji Sano; Nobuo Suzuki; Shu Watarai, all of Kanagawa, Japan

[73] Assignee: Fuji Photo Film Co., Ltd., Kanagawa, Japan

[21] Appl. No.: 974,215

[22] Filed: Nov. 10, 1992

[30] Foreign Application Priority Data

Nov. 21, 1991 [JP] Japan ................................. 3-306070

[51] Int. Cl.$^5$ ............................................. G03G 9/135
[52] U.S. Cl. ..................................... 430/115; 430/114
[58] Field of Search ................................ 430/114, 115

[56] References Cited

U.S. PATENT DOCUMENTS 5,073,471 12/1991 Kato et al. ........................... 430/115
5,085,966 2/1992 Suzuki et al. ....................... 430/115
5,112,718 5/1992 Kato et al. ........................... 430/115

*Primary Examiner*—Roland Martin
*Attorney, Agent, or Firm*—Sughrue, Mion, Zinn, Macpeak & Seas

[57] ABSTRACT

A positively chargeable liquid developer for electrostaticphotography comprising a non-aqueous solvent having a volume specific resistance of at least $10^9$ Ωcm and resin grains dispersed therein, wherein the resin grains contain a dispersion stabilizing resin which is dissolved or dispersed in a colloidal form in the non-aqueous solvent and which mainly comprises a graft copolymer composed of (1) at least one macromonomer (M) having a weight average molecular weight of from $1\times10^3$ to $1\times10^5$ obtained by bonding a terminal carboxyl group bonded to the main chain of a polymer containing at least one specific polymer component to an epoxy compound having at least one polymerizable double bond group, using a quaternary ammonium salt as a reaction catalyst, and (2) at least one specific monomer, which gives the definite chargeability, easily controls the charge amount, is excellent in dispersion stability and endures long-term use and storage.

20 Claims, No Drawings

LIQUID DEVELOPER FOR ELECTROSTATIC PHOTOGRAPHY

FIELD OF THE INVENTION

The present invention relates to a liquid developer used for development of electrostatic latent images.

BACKGROUND OF THE INVENTION

A liquid developer for electrostatic photography generally comprises a liquid carrier having a high electric resistance (from $10^9$ to $10^{15}$ Ω.cm), positively or negatively charged toner particles, a fixing resin for providing a fixing ability to the toner particles, a dispersing agent for stably dispersing the toner particles, a charge controlling agent for positively or negatively charging the toner particles and various additives. The charge controlling agent provides a definitely positively or negatively charged polarity to the toner particles, and controls the amount of the charge, and, thus, the agent is an essential ingredient for the liquid developer.

When the toner particles are composed of a resin which acts as a fixing resin, charge controlling can be roughly divided into two methods. The first method comprises introducing an ingredient for providing chargeability to the toner particles and receiving ions by adding a charge controlling material to generate a charge. The known charge-providing components used for this purpose include monomers containing tertiary amines or quaternary ammonium salts (for example, dimethylaminoethyl methacrylate and octyl tosylate of dimethylaminoethyl methacrylate). The known charge controlling materials include metal salts of naphthenic acid such as nickel naphthenate and cobalt naphthenate; metal soaps such as cobalt 2-ethylhexanate; metal salts of sulfonic acid such as calcium dodecylbenzenesulfonate, metal salts of petroleum sulfonic acid and metal salts of sulfosuccinic acid esters; lecithin; polyvinylpyrrolidone resins; polyamide resins; sulfonic acid-containing resins as described in JP-B-56-24944 (the term "JP-B" as used herein means an "examined Japanese patent publication"); hydroxybenzoic acid derivatives as described in JP-A-57-139753 (the term "JP-A" as used herein means an "unexamined published Japanese patent application"); metal salts such as a nickel salt of amino acid derivatives as described in JP-A-61-50951; semi-alkylamide compounds of diisobutylene-maleic acid copolymers as described in JP-B-49-26596; semi-maleic acid amides as described in JP-A-60-173558, JP-A-60-179750 and JP-A-60-182447; and itaconic anhydride derivatives.

This method, however, has a problem in that introduction of the charge-providing component greatly affects grain sizes and polymerization reactivity of resin grains when the resin grains are formed in the presence of a dispersion stabilizing resin which is dissolved or dispersed in a colloidal form in an non-aqueous solvent. Thus, the amount of the charge-providing component is markedly limited thereby resulting in the difficulty of controlling the charge amount.

The second method comprises coating the toner particles with a material having a component for providing chargeability (which may be the dispersion stabilizing resin) and transferring ions by adding the charge controlling material to generate charge. The charge-providing components include, for example, soluble quaternary ammonium copolymers as described in JP-A-54-31739, JP-A-59-137960 and JP-A-61-39059. The charge controlling materials include the same materials as used in the first method described above. This method has an advantage of exerting less influence on the polymerization reactivity as compared with the first method, and particularly making it possible to introduce a quaternary ammonium salt. However, the dispersing agent into which a quaternary ammonium salt has been introduced has disadvantages in that solvents used for the synthesis of resins is largely restricted because of its amphiphilicity, i.e., both the hydrophilicity and the lipophilicity, and that the use of the quaternary ammonium salt in polymerization reaction is largely restricted because of its insufficient solubility in non-aqueous solvents.

SUMMARY OF THE INVENTION

A first object of the present invention is to provide a positively chargeable liquid developer in which the above-described problems of charge controlling of the conventional liquid developers have been improved.

A second object of the present invention is to provide a positively chargeable liquid developer which is used for developing printing plates prepared by maintaining an image area as resists and dissolving out a non-image area, and which has a resist property to an etching solution and excellent in chargeability, dispersion stability, redispersibility and fixing ability.

According to the present invention, there is provided a positively chargeable liquid developer for electrostatic photography comprising a non-aqueous solvent having a volume specific resistance of at least $10^9$ Ωcm and resin grains dispersed therein, wherein the resin grains are obtained by polymerization of a monomer which is soluble in the non-aqueous solvent but becomes insoluble therein by being polymerized, in the presence of a dispersion stabilizing resin which is dissolved or dispersed in a colloidal form in the non-aqueous solvent and which mainly comprises a graft copolymer composed of (1) at least one macromonomer (M) having a weight average molecular weight of from $1 \times 10^3$ to $1 \times 10^5$ obtained by bonding a terminal carboxyl group bonded to the main chain of a polymer containing at least one polymer component represented by the following general formula (I) to an epoxy compound having at least one polymerizable double bond group, using a quaternary ammonium salt as a reaction catalyst, and (2) at least one monomer represented by the following general formula (II).

The present invention further provides a positive charge liquid developer for electrostatic photography comprising a non-aqueous solvent, resin grains dispersed therein, said resin grains being obtained by polymerizing a monomer which is soluble in the non-aqueous solvent but becomes insoluble therein by being polymerized, in the presence of a dispersion stabilizing resin which is dissolved or dispersed in a colloidal form in the non-aqueous solvent and which mainly comprises a graft copolymer composed of (1) at least one macromonomer (M) having the above-described structure synthesized without using a quaternary ammonium salt as a catalyst and (2) at least one monomer represented by the following general formula (II), and the dispersion stabilizing resin used in the above-described developer, wherein the dispersion stabilizing resin is added to the dispersion of the resin particles later.

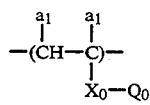

wherein $X_0$ represents

—COO—, —OCO—, —(CH$_2$)$_k$—OCO—,

—(CH$_2$)$_k$—COO—, —O—, —CONHCOO—,

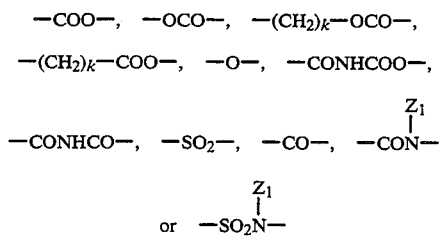

(wherein $Z_1$ represents a hydrogen atom or a hydrocarbon group, and k represents an integer of 1 to 3); $a_1$ and $a_2$, which may be the same or different, each represents a hydrogen atom, a halogen atom, a cyano group, a hydrocarbon group, —COO—$Z_2$ or —COO—$Z_2$ bonded via a hydrocarbon group (wherein $Z_2$ represents a hydrogen atom or a hydrocarbon group which may be substituted); and $Q_0$ represents an aliphatic group having from 4 to 22 carbon atoms.

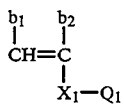

wherein $X_1$ represents

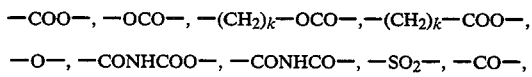

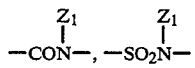

or a phenylene group (hereinafter referred to as Ph, wherein Ph includes 1,2-, 1,3- and 1,4-phenylene groups) (wherein $Z_1$ represents a hydrogen atom or a hydrocarbon group, and k represents an integer of from 1 to 3); $Q_1$ represents a hydrogen atom, an aliphatic group having from 1 to 22 carbon atoms or an aromatic group having from 6 to 12 carbon atoms; and $b_1$ and $b_2$, which may be the same or different, have the same meanings as $a_1$ and $a_2$ defined in the general formula (I).

DETAILED DESCRIPTION OF THE INVENTION

The liquid developer of the present invention is described hereinafter in detail.

The liquid carrier used in the liquid developer of the present invention is a non-aqueous solvent having an electrical resistance of at least $10^9$ Ω·cm, and preferably non-aqueous solvents having an electrical resistance of at least $10^9$ and a dielectric constant of not higher than 3. The non-aqueous solvent includes straight chain or branched aliphatic hydrocarbons, alicyclic hydrocarbons, aromatic hydrocarbons and halogen-substituted compounds thereof. Specific examples thereof include octane, isooctane, decane, isodecane, decalin, nonane, dodecane, isododecane, cyclohexane, cyclooctane, cyclodecane, benzene, toluene, xylene, mesitylene, Isopar E, Isopar G, Isopar H, Isopar L (Isopar is the trade name of Exxon Co.), Shellsol 70, Shellsol 71 (Shellsol is the trade name of Shell Oil Co.), Amsco OMS and Amsco 460 solvent (Amsco is the trade name of American Mineral Spirits Co.). These solvents may be used singly or as a combination thereof.

The non-aqueous solvent dispersed resin grains (hereinafter often referred to as latex grains) used in the present invention are produced by polymerizing (i.e., polymerization granulation) the monomer in the presence of the dispersing agent or the above-described graft type copolymer in the non-aqueous solvent.

Basically, any non-aqueous solvents can be used as long as they are miscible with the liquid carrier used in the liquid developers for electrostatic photography.

That is, any solvents may be used in producing the dispersed resin grains as long as they are miscible with the above-described liquid carrier. Preferred examples of such solvents include straight chain or branched aliphatic hydrocarbons, alicyclic hydrocarbons, aromatic hydrocarbons and halogen-substituted compounds thereof, for example, hexane, octane, isooctane, decane, isodecane, decalin, nonane, dodecane, isododecane, Isopar E, Isopar G, Isopar H, Isopar L, Shellsol 70, Shellsol 71, Amsco OMS and Amsco 460 solvents. These solvents may be used singly or as a combination thereof.

Solvents which can be used together with these organic solvents include alcohols (such as methyl alcohol, ethyl alcohol, propyl alcohol, butyl alcohol and fluorinated alcohol); ketones (such as acetone, methyl ethyl ketone and cyclohexanone); carboxylic acid esters (such as methyl acetate, ethyl acetate, propyl acetate, butyl acetate, methyl propionate and ethyl propionate); ethers (such as diethyl ether, dipropyl ether, tetrahydrofuran and dioxane); and halogenated hydrocarbons (such as methylene dichloride, chloroform, carbon tetrachloride, dichloroethane and methylchloroform).

It is preferred that the non-aqueous solvents which are used as a mixture thereof are distilled off by heating or under reduced pressure after completion of polymerization granulation. However, even if the non-aqueous solvent is brought in the liquid developer as a latex grain dispersions, the solvent gives no problem as long as the liquid electric resistance of the liquid developer is in the range of satisfying the condition of at least $10^9$ Ω·cm.

In general, it is preferred to use solvents similar to the liquid carrier in the stage of producing the resin dispersion, and, as described above, the solvent to be used is selected from the straight or branched chain aliphatic hydrocarbons, alicyclic hydrocarbons, aromatic hydrocarbons and halogenated hydrocarbons thereof.

The graft copolymers are further described below.

The macromonomer (M) is a macromonomer having a weight average molecular weight of from $1 \times 10^3$ to $1 \times 10^5$ obtained by bonding one terminal carboxyl group of the main chain of a polymer having a repeating unit represented by the general formula (I) to an epoxy compound having at least one polymerizable double bond group which is copolymerizable with a monomer represented by the general formula (II), using a quaternary ammonium salt as a reaction catalyst.

In the general formula (I), $X_0$ represents

—COO—, —OCO—, —(CH$_2$)$_k$—OCO—,

-continued

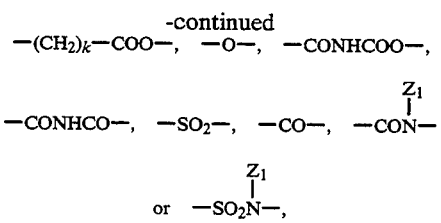

wherein $Z_1$ represents a hydrogen atom or a hydrocarbon group, $a_1$ and $a_2$ may be the same or different, and k represents an integer of 1 to 3.

$Z_1$ preferably represents a hydrogen atom, an alkyl group, an alkenyl group, an aralkyl group, an alicyclic group or an aryl group having from 1 to 22 carbon atoms which may be substituted.

Preferred examples of the hydrocarbon groups include an alkyl group having from 1 to 22 carbon atoms which may be substituted (for example, methyl, ethyl, propyl, butyl, heptyl, hexyl, octyl, decyl, dodecyl, tridecyl, tetradecyl, hexadecyl, octadecyl, 2-chloroethyl, 2-bromoethyl, 2-cyanoethyl, 2-methoxycarbonyl-ethyl, 2-methoxyethyl and 2-bromopropyl); an alkenyl group having from 4 to 18 carbon atoms which may be substituted (for example, 2-methyl-1-propenyl, 2-butenyl, 2-pentenyl, 3-methyl-2-pentenyl, 1-pentenyl, 1-hexenyl, 2-hexenyl and 4-methyl-2-hexenyl); an aralkyl group having from 7 to 12 carbon atoms which may be substituted (for example, benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl and dimethoxybenzyl); an alicyclic group having from 5 to 8 carbons which may be substituted (for example, cyclohexyl, 2-cyclohexyl-ethyl and 2-cyclopentylethyl); an aromatic group having from 6 to 12 carbon atoms which may be substituted (for example, phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonyl-phenyl, ethoxycarbonylphenyl, butoxycarbonylphenyl, acetamidophenyl, propioamidophenyl and dodecyloylamido-phenyl); and a cross-linked hydrocarbon group having from 5 to 18 carbon atoms (for example, bicyclo[1,1,0]butane, bicyclo[3,2,1]octane, bicyclo[5,2,0]nonane, bicyclo[4,3,2]-undecane and adamantane).

$a_1$ and $a_2$, which may be the same or different, each preferably represents a hydrogen atom, a halogen atom (for example, a chlorine atom or a bromine atom), a cyano group, an alkyl group having from 1 to 3 carbon atoms (for example, methyl, ethyl or propyl), —COO—$Z_2$ or —CH$_2$COOZ$_2$ (wherein $Z_2$ preferably represents a hydrogen atom, or an alkyl group having from 1 to 18 carbon atoms, an alkenyl group having from 2 to 18 carbon atoms, an aralkyl group having from 7 to 18 carbon atoms, an alicyclic group having from 3 to 18 carbon atoms or an aryl group having from 6 to 18 carbon atoms which may be substituted, and specifically, it has the same meaning as defined for $Z_1$ described above.

$Q_0$ represents an aliphatic group having from 4 to 22 carbon atoms, and specifically, has the same meaning as defined for the alkyl group represented by $Z_1$ above.

In the above-described general formula (I), particularly preferred examples of $X_0$, $a_1$ and $a_2$ are as follows.

$X_0$ represents at least one linking group selected from —COO—, —OCO—, —O—, —CH$_2$COO— and —CH$_2$OCO—, and $a_1$ and $a_2$ represents a hydrogen atom and a methyl group.

The repeating unit of the macromonomer used in the present invention includes at least one unit represented by the general formula (I). Preferred examples thereof are shown below, but the scope of the present invention is not limited thereto.

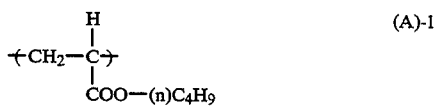

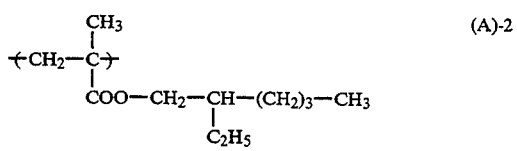

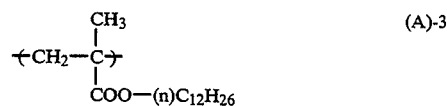

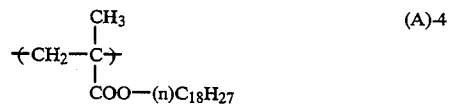

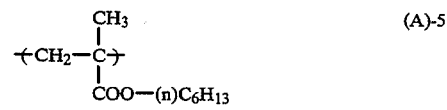

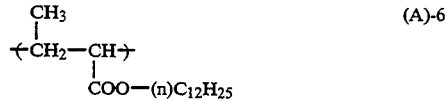

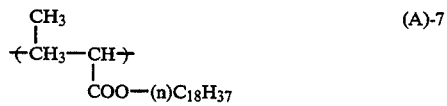

The macromonomer (M) used in the present invention is a macromonomer having a weight average molecular weight of from $1 \times 10^3$ to $1 \times 10^5$ obtained by bonding a terminal carboxyl group of the main chain of a polymer containing at least one polymer component represented by the following general formula (I) to an epoxy compound having at least one polymerizable double bond group, using a quaternary ammonium salt as a reaction catalyst.

The macromonomer (M) used in the present invention can be produced by known synthesis methods. For example, the method includes a radical polymerization in which an oligomer having a terminal carboxyl group obtained by a radical polymerization using a polymerization initiator containing a carboxyl group in its molecule and/or a chain transfer agent is reacted with an epoxy compound having a polymerizable double bond group using a quaternary ammonium salt as a reaction catalyst, thereby to form a macromonomer. Specifically, the macromonomer can be synthesized according to the method described in JP-A-62-232408. Preferred examples of the above-described epoxy compound having a polymerizable double bond groups include glycidyl methacrylate and glycidyl acrylate.

In producing the macromonomer, the quaternary ammonium salt is used as a reaction catalyst. By using the quaternary ammonium salt as the reaction catalyst, not only the macromonomer can be prevented from being colored, but also unexpectedly it becomes possible to impart chargeability to the toner particles by incorporating the quaternary ammonium salt into the macromonomer, in its turn, into the dispersion stabilizing resin.

The quaternary ammonium salt used in the present invention can be represented by $R_1R_2R_3R_4N^+X^-$. $R_1$, $R_2$, $R_3$ and $R_4$ each represents an alkyl group having from 1 to 32 carbon atoms which may be substituted (for example, methyl, ethyl, butyl, hexyl, octyl, decyl, dodecyl, hexadecyl, octadecyl, docosanyl, 2-ethylhexyl, 4-butoxybutyl and N, N-dibutylaminopropyl); an alkenyl group having from 3 to 32 carbon atoms which may be substituted (for example, allyl, 2-pentenyl, 4-propyl-2-pentenyl, decenyl, oleyl and linoleyl); an aralkyl group having from 7 to 36 carbon groups which may be substituted (for example, benzyl and phenethyl); an alicyclic hydrocarbon group having from 5 to 32 carbons which may be substituted (for example, cyclopentyl, cyclohexyl, bicyclo[2,2,1]-heptyl and cyclohexenyl); an aryl group having from 6 to 38 carbon atoms which may be substituted (for example, phenyl, tolyl, 4-butylphenyl, 4-decylphenyl and 4-butoxyphenyl); or a heterocyclic group having at least 5 carbon atoms (for example, furyl and thienyl). The substituent groups include fluorine, chlorine, bromine, iodine, hydroxyl, nitro, nitrile, amino, alkoxy, sulfo and carboxyl.

$R_1$, $R_2$, $R_3$ and $R_4$ may be the same or different. Two of $R_1$, $R_2$, $R_3$ and $R_4$ may be linked together, and may have intervening 1 to 4 hetero atoms. They may further contain 0 to 6 double bonds and may form a mononuclear or polynuclear cyclic compound containing from 4 to 12 carbon atoms which is substituted by a halogen atom, an alkyl group having from 1 to 6 carbon atoms, an alkoxy group having from 1 to 6 carbon atoms, a hydroxyl group, a nitro group or an amino group.

$X^-$ represents an organic or inorganic anion. $R_1$ to $R_4$ may be substituted by $-COO^-$ or $-SO_3^-$. In this case, $X^-$ need not be present.

$X^-$ includes anions of halogen atoms (for example, $Cl^-$, $Br^-$ and $I^-$), $PF_6^-$, sulfates, phosphates, cyanates, thiocyanates, $BF_4^-$, $B(aryl)_4^-$ (for example, tetraphenyl borate, p-chlorotetraphenyl borate and p-methyltetraphenyl borate), phenolates, nitrophenolates, saturated or unsaturated carboxylates or aromatic carboxylates (for example, acetates, lactates, benzoates and salicylates), sulfonates (for example, ethylsulfonate, phenylsulfonate and p-toluenesulfonate).

Specific examples of the quaternary ammonium salts include tetramethylammonium chloride, tetramethylammonium p-toluenesulfonate, tetramethylammonium tetraphenylborate, tetraethylammonium bromide, tetraethyl-ammonium salicylate, tetra-n-propylammonium bromide, tetrabutylammonium chloride, tetrabutylammonium phenylsulfonate, tetraoctylammonium iodide, cetyltrimethylammoniumchloride, cetyldimethylammoniumbromide, benzyltrimethyl-ammonium chloride, butylpyridinium bromide, laurylpyridinium bromide, cetylpyridinium chloride, 1-hexadecylpyridinium chloride and 2-dodecylisoquinolium bromide, but the present invention is not limited to these examples.

Any solvents may be used as a reaction solvent as long as they can dissolve the macromonomer. Examples of such solvents include toluene, xylene, benzene, methyl ethyl ketone, methyl isobutyl ketone, butyl acetate and N-dimethylformamide. In particular, toluene and butyl acetate are preferably used. In addition, in order to prevent polymerization during the production of the macromonomer, it is preferred that a radical polymerization inhibitor such as hydroquinones and hydroquinone monomethyl ethers is added at a stage of the macromonomer forming reaction.

The polymerization inhibitor is added preferably in an amount of 10 to 1000 ppm based on the total amount of the reaction solution.

The polymerizable double bond-containing epoxy compound such as glycidyl methacrylate is preferably added in an amount of from 0.9 to 3.0 times molar equivalent to that of carboxyl groups contained in the reaction solution. Further, the quaternary ammonium salt as a reaction catalyst is preferably added in an amount of from 0.1 to 5.0% by weight based on the total amount of the reaction solution.

Generally, the reaction temperature is preferably from 50° to 200° C., and more preferably from 70° to 150° C.

The monomers represented by general formula (II) which are components of the graft copolymers in combination with the above-described macromonomers (M) are described below.

In general formula (II), $X_1$ has the same meaning as defined for the linkage group represented by $X_0$ in general formula (I), and preferred examples thereof include $-COO-$, $-OCO-$, $-CH_2OCO-$, $-CH_2COO-$, $-O-$ and $-Ph-$. $Q_1$ represents a hydrogen atom, an aliphatic group having from 1 to 22 carbon atoms or an aromatic group having from 6 to 12 carbon atoms. Specifically, it has the same meaning as defined for the aliphatic group or the aromatic group represented by $Z_1$ in general formula (I).

$b_1$ and $b_2$ may be the same or different, and specifically, they have the same meanings as defined for $a_1$ and $a_2$ in general formula (I). It is preferred that either of $b_1$ and $b_2$ is a hydrogen atom.

The graft copolymer may contain other monomers which are copolymerizable with the monomer represented by general formula (II) in addition to this monomer. Examples of such other monomers include acrylonitrile, methacrylonitrile, acrylamide, methacrylamide, hydroxyethyl methacrylate, dialkylaminoethyl methacrylates (for example, dimethylaminoethyl methacrylate), styrene, chlorostyrene, bromostyrene, vinylnaphthalene, polymerizable double bond group-containing heterocyclic compounds (for example, vinylpyridine, vinylimidazoline, vinylthiophene, vinyldioxane and vinylpyrrolidone), unsaturated carboxylic acids (for example, acrylic acid, methacrylic acid, itaconic acid, crotonic acid and maleic acid), itaconic anhydride and maleic anhydride.

The monomer other than the monomer represented by general formula (II) may be any monomer as long as it is polymerizable, and is preferably contained in an amount of 30% by weight based on the whole components of the graft copolymer.

In the graft copolymer used in the present invention, at least one polar group selected from the group consisting of the following specific polar groups may be bonded only one terminal of the main chain of the polymer.

Such polar groups include $-PO_3H_2$, $-SO_2H$, $-COOH$, $-OH$, $-SH$, $-(Z_0)P(O)OH$ (wherein $Z_0$ represents $-Z_{10}$ or $-OZ_{10}$, wherein $Z_{10}$ represents a hydrocarbon group), formyl and amino.

In $-(Z_0)P(O)OH$ of the polar group, $Z_0$ represents $-Z_{10}$ or $-OZ_{10}$, wherein $Z_{10}$ preferably represents a hydrocarbon group having from 1 to 18 carbon atoms. More preferred examples of the hydrocarbon groups represented by $Z_{10}$ include an aliphatic group having from 1 to 8 carbon atoms which may be substituted (for example, methyl, ethyl, propyl, butyl, pentyl, hexyl, butenyl, pentenyl, hexenyl, 2-chloroethyl, 2-cyanoethyl, cyclopentyl, cyclohexyl, benzyl, phenethyl, chlorobenzyl and bromobenzyl); and an aromatic group which may be substituted (for example, phenyl, tolyl, xylyl, mesityl, chlorophenyl, bromophenyl, methoxyphenyl and cyanophenyl).

In the polar groups used in the present invention, the amino group represents $-NH_2$, $-NHZ_{11}$ or $-NZ_{11}(Z_{12})$. Each of $Z_{11}$ and $Z_{12}$ independently represents a hydrocarbon group having from 1 to 18 carbon groups, and preferably a hydrocarbon group having from 1 to 8 carbon atoms. Specifically, it has the same meaning as defined for the hydrocarbon group represented by $Z_1$ described above.

More preferably, the hydrocarbon group represented by $Z_{10}$, $Z_{11}$ and $Z_{12}$ includes an alkyl group having from 1 to 4 carbon atoms which may be substituted, a benzyl group which may be substituted and a phenyl group which may be substituted.

The polar group has a chemical structure in which the polar group is bonded directly to one of the terminals of the main chain of the polymer or bonded through a linkage group. The bond which connects the graft copolymer component to the polar group include a carbon-carbon bond (single or double bond), a carbon-hetero atom bond (examples of the hetero atoms include an oxygen atom, a sulfur atom, a nitrogen atom and a silicon atom), a hetero atom-hetero atom bond and a combination thereof.

The graft copolymer in which the specific polar group is bonded to only one terminal of the main chain of the polymer can be easily produced by the methods described in the reviews such as Y. Chujyo and Y. Yamashita, *Senryou to Yakuhin (Dyes and Drugs)*, 30, 232 (1985) and A. Ueda and S. Nagai, *Kagaku to Kougyou (Chemistry and Industry)*, 60, 57 (1986) and in the literature references cited therein.

The monomer used in the dispersed resin grains of the present invention may be any monomers as long as they are soluble in non-aqueous solvents and become insoluble therein by being polymerized. Specific examples of the monomers include vinyl esters of aliphatic carboxylic acids having from 1 to 6 carbon atoms (for example, vinyl acetate) or allyl esters thereof; alkyl esters or amides of unsaturated carboxylic acids such as acrylic acid, methacrylic acid, crotonic acid, itaconic acid and maleic acid wherein the alkyl group has from 1 to 4 carbon atoms which may be substituted (for example, methyl, ethyl, propyl, butyl, 2-chloroethyl, trifluoroethyl, 2-cyanoethyl, 2-methoxyethyl, N, N-dimethylaminoethyl, 2-carboxyethyl and 2-furfurylethyl); acrylonitrile; methacrylonitrile; styrene derivatives (styrene, chlorostyrene and bromostyrene); vinylnaphthalene; polymerizable double bond group-containing heterocyclic compounds (for example, vinylpyridine, vinylimidazoline, vinylthiophene, vinyldioxane and vinylpyrrolidone), unsaturated carboxylic acids (for example, acrylic acid, methacrylic acid, itaconic acid, crotonic acid and maleic acid); itaconic anhydride and maleic anhydride.

These monomers may be used in combination of two or more thereof. Of these monomers, the alkyl esters of acrylic acid and methacrylic acid are preferred.

In addition to the above-described preferred monomers, the dispersed resin grains may contain other monomers (c) which are copolymerizable with these monomers.

The monomers (c) include vinyl monomers having basic nitrogen atoms or amido groups.

Specific examples of the vinyl monomers having basic nitrogen atoms or amido groups include aminoalkyl-substituted (meth)acrylates such as dimethylaminoethyl methacrylate, quaternary salts of aminoalkyl-substituted (meth)acrylates, N-vinylimidazole, N-vinyl-2-methylimidazole, 1-vinylpyrrole, N-β-acryloxyethylindole, 2-vinylquinoline, 4-vinylpyridine, 5-vinyl-4-methylthiazole, 3-methyl-5-isopropenylpyrazole, N-vinyl-2-pyrrolidone, N-vinylpiperidone, N-vinyloxazoline, dimethylaminostyrene, dialkylaminomethylstyrene, quaternary salts of dialkylaminostyrene and (meth)acrylamide.

The content of the additional monomer (c) which are copolymerizable with the above-described monomers is 30 mol % or less based on the whole monomers.

The dispersed resin grains used in the present invention have a weight average molecular weight of from $1 \times 10^3$ to $1 \times 10^6$.

For producing the dispersed resin grains (latex grains) used in the present invention, generally the dispersion stabilizing resin as described above and the (meth)acrylic acid ester monomers can be polymerized by heating in the non-aqueous solvent in the presence of a polymerization initiator such as benzoyl peroxide, azobis (2,4-dimethylvaleronitrile), azobis (4-methoxy-2,4-dimethylvaleronitrile), azobisisobutylonitrile or butyllithium.

Specifically, the dispersed resin grains can be produced by any of the methods such as (1) a method of adding a polymerization initiator to a mixed solution of the dispersion stabilizing resin, a monomer (a), a monomer (b), and, optionally, a monomer (c); (2) a method of adding dropwise a monomer (a), a monomer (b)and, optionally, a monomer (c), together with a polymerization initiator, to a solution in which the dispersion stabilizing resin has been dissolved; (3) a method of adding the polymerization initiator and a part of a mixture of a monomer (a), a monomer (b) and, optionally, a monomer (c) to a solution of the total amount of the dispersion-stabilizing resin and the remaining monomer (a), monomer (b) and, optionally, monomer (c); and (4) a method of adding a solution of the dispersion stabilizing resin and the monomers together with a polymerization initiator to a non-aqueous solution.

The total amount of the monomers is from about 5 to about 80 parts by weight per 100 parts by weight of non-aqueous solvent, and preferably 10 to 50 parts by weight.

The amount of the resin soluble or dispersed in a colloidal form as a dispersion stabilizing resin is from 1 to 100 parts by weight per 100 parts by weight of the whole monomers used above, and preferably 3 to 50 parts by weight.

The amount of the polymerization initiator is suitably from 0.1 to 5 mol % of the whole monomers. The polymerization temperature is from about 20° to about 180°

C., and preferably 30° to 120° C. The reaction time is preferably 1 to 15 hours.

When the above-described polar solvent such as alcohols, ketones, ethers and esters is used together with the non-aqueous solvents for the reaction, or when unreacted monomer (a), the monomer (b) and, optionally, the monomer (c) remain without being polymerization-granulated, it is preferred to remove the polar solvents or the unreacted monomers by heating the reaction mixture to the boiling point of the solvent or the monomers for distilling-off them or to distil off the solvent or the monomers under reduced pressure.

The latex grains dispersed in a non-aqueous solvent thus produced exist as fine grains having a uniform grain size distribution and show a very stable dispersibility. In particular, when the liquid developer composed of the latex grains are repeatedly used in a developing device for a long period of time, the dispersibility thereof is good and when the development speed is increased, the re-dispersibility is easy and the occurrence of stains by adhesion of the grains onto each part of the developing device is not observed.

Also, when the latex grains are fixed by heating, etc., a strong coating or layer having an excellent fixing property can be formed.

Furthermore, the liquid developer according to the present invention shows excellent dispersion stability, re-dispersibility, and fixing property when the liquid developer is used in a quickened development-fix step with a prolonged interval period of the maintenance.

The liquid developer of the present invention may contain, if desired, a colorant.

There is no specific restriction on the colorant being used, and any conventional pigments or dyes can be used as the colorant in the present invention.

In the case of coloring the dispersion resin itself, there is, for example, a method of coloring the dispersion resin by physically dispersing a pigment or dye in the dispersion resin and various pigments and dyes can be used. For example, there are a magnetic iron oxide powder, a lead iodide powder, carbon black, nigrosine, Alkali Blue, Hansa Yellow, quinacridone red, phthalocyanine blue, etc.

As another method of coloring the dispersion resin grains, the dispersion resin may be dyed with a desired dye, for example, as disclosed in JP-A-57-48738. As still other method, a dye may be chemically bonded to the dispersion resin as disclosed, for example, in JP-A-53-54029 or a previously dye-containing monomer is used in the polymerization granulation to provide a dye-containing dispersion resin as disclosed, for example, in JP-B-44-22955.

The liquid developer of the present invention can be used for developing light-sensitive materials using known organic photoconductive materials or inorganic photoconductive materials. Specific examples of the organic photoconductive materials include the materials described in *Research Disclosure*, 10938 (May 1973), page 61 et seq., entitled "Electrophotographic Elements, Materials and Processes". Specific examples of the inorganic photoconductive materials include the compounds disclosed in R. M. Schaffert, *Electrophotography*, pages 260 to 374, published by Focal Press (1975).

Various charge controlling agents can be added to the liquid developer of the present invention for increasing the charge characteristics or improving the image characteristics.

For the liquid developer of the present invention, known charge controlling agents can be used. Examples of such agents include metal salts of aliphatic acids such as naphthenic acid, octenoic acid, oleic acid and stearic acid; metal salts of sulfosuccinic acid esters; oil-soluble metal salts of sulfonic acid as described tin JP-B-45-556, JP-A-52-37435 and JP-A-52-37049; metal salts of phosphoric acid esters as described in JP-B-45-9594; metal salts of abietic acid or hydrogenated abietic acid as described in JP-B-48-25666; calcium alkylbenzenesulfonates as described in JP-B-55-2620; metals salts of aromatic carboxylic acids or sulfonic acid as described in JP-A-52-107837, JP-A-52-38937, JP-A-57-90643 and JP-A-57-139753; nonionic surface active agents such as polyoxyethylated alkylamines; fats and oils such as lecithin and linseed oil; polyvinylpyrrolidone; organic acid esters of polyhydric alcohols; phosphoric acid ester surface active agents as described in JP-A-57-210345; sulfonic acid resins as described in JP-B-56-24944; amino acid derivatives as described in JP-A-60-21056 and JP-A-61-50951; copolymers containing maleic acid half-amide components as described in JP-A-60-173558 and JP-A-60-179750; and quaternary amine polymers as described in JP-A-54-31739 and JP-B-56-24944.

Of these agents, metal salts of naphthenic acid, metal salts of dioctyl sulfosuccinate, copolymers containing maleic acid half-amide components, lecithin and the above-described amino acid derivatives are preferably used.

These charge controlling agents can also be used in combination of two or more thereof. The charge controlling agents are preferably used in an amount of 0.001 to 1.0 part by weight per 1000 parts by weight of the liquid carrier.

Furthermore, various additives may be added thereto if desired. The upper limit of the total amount of these additives is restricted by the electric resistance of the liquid developer. That is, if the electric resistance of the liquid developer from which the toner particles are excluded is lower than $10^9$ $\Omega$cm, it becomes difficult to obtain continuous gradation images of good quality. It is therefore necessary to control the amount of each additive added within this limit.

Production examples of the dispersion stabilizing resins, production examples of the latex particles and examples of the present invention are hereinafter described, but it should be understood that the scope of the present invention is not limited thereto. The macromonomers used for the dispersion stabilizing resins can be easily produced by the method as described in JP-A-62-232408.

In the following examples, the term "latex grains" is used in place of the term "copolymer resin grains" which is often used in the specification in order to distinguish them from the dispersion stabilizing resins.

PRODUCTION EXAMPLE 1 OF MACROMONOMER (M-1)

A mixed solution of 100 g of octadecyl methacrylate, 1.4 g of thioglycolic acid and 100 g of toluene was heated to a temperature of 70° C. with stirring under nitrogen stream. Then, 1.0 g of azobisisobutyronitrile (hereinafter abbreviated as A.I.B.N.) was added thereto, followed by reacting for 4 hours. The resulting reaction solution was cooled to room temperature, and 3.0 g of glycidyl methacrylate, 0.05 g of hydroquinone and 1.2 g of tetrabutylammonium bromide were added thereto, followed by reacting at 90° C. for 5 hours.

After cooling, the reaction solution was reprecipitated in 2 liters of methanol, and the precipitated white solid was collected by decantation and dissolved in 300 ml of tetrahydrofuran. The solution was reprecipitated again in 3 liters of methanol. The precipitated white powder was collected and dried under reduced pressure to obtain 94.0 g of a polymer having a weight average molecular weight of 13,200. The molecular weight is a polystyrene converted value by the GPC method.

Macromonomer M-1

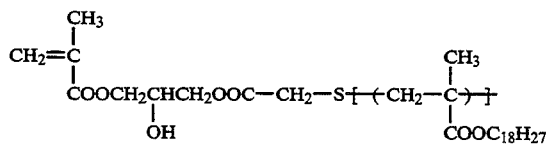

PRODUCTION EXAMPLES 2 TO 7 OF MACROMONOMERS (M-2 TO M-7)

Each of the macromonomers shown in Table A below was prepared in the same manner as described in Production Example 1 of Macromonomer M-1 by changing a methacrylate monomer (corresponding to octadecyl methacrylate), a chain transfer agent (corresponding to thioglycolic acid), a polymerization initiator (corresponding to A.I.B.N.) and an epoxy compound (corresponding to glycidyl methacrylate) in Production Example 1 of Macromonomer M-1. The weight average molecular weight of the resulting macromonomers was in the range of from 3000 to 15000.

TABLE A

| Production Example of Macromonomer | Macromonomer | Chemical Structure of Macromonomer |
|---|---|---|
| 2 | M-2 | $CH_2=CH-COOCH_2CHCH_2OOC-CH_2S\text{-}(CH_2-C(CH_3)(COOC_{18}H_{37}))\text{-} ;\ OH$ |
| 3 | M-3 | $CH_2=C(CH_3)-COOCH_2CHCH_2OOC-(CH_2)_2S\text{-}(CH_2-C(CH_3)(COO-C_4H_9))\text{-} ;\ OH$ |
| 4 | M-4 | $CH_2=C(CH_3)-COOCH_2CH-CH_2OOC-(CH_2)_2S\text{-}(CH_2-C(CH_3)(COOCH_2CH(C_2H_5)(CH_2)_3CH_3))\text{-} ;\ OH$ |
| 5 | M-5 | $CH_2=C(CH_3)-COOCH_2CHCH_2OOC(CH_2)_2S\text{-}(CH_2-C(CH_3)(COOC_{12}H_{25}))\text{-} ;\ OH$ |
| 6 | M-6 | $CH_2=C(CH_3)-COOCH_2CHCH_2OOC(CH_2)_2C(CH_3)(CN)\text{-}(CH_2-C(CH_3)(COOC_{12}H_{25}))\text{-} ;\ OH$ |
| 7 | M-7 | $CH_2=CH-COOCH_2CHCH_2OOC(CH_2)_2C(CH_3)(CN)\text{-}(CH_2-C(CH_3)(COOC_{18}H_{37}))\text{-} ;\ OH$ |

PRODUCTION EXAMPLE 1 OF DISPERSION STABILIZING RESIN (P-1).

A mixed solution of 10 g of methyl methacrylate, 90 g of Macromonomer M-1 and 200 g of toluene was placed in a four-necked flask and heated to a temperature of 80° C. with stirring under nitrogen stream.

Then, 1 g of 1,1′-azobis(1-cyclohexanecarbonitrile) was added thereto as a polymerization initiator, and the mixture was polymerized at 80° C. for 24 hours. After polymerization, the product was cooled to room temperature, and 200 g of toluene was further added thereto. The polymerization product was reprecipitated in 4 liters of methanol. After filtration, the resulting white powder was dried to obtain 95 g of a polymer having a weight average molecular weight of $6.4 \times 10^4$.

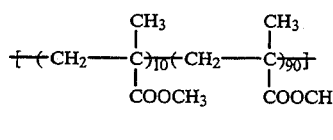 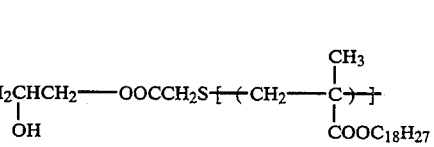

The copolymerization ratio is represented by a weight ratio.

PRODUCTION EXAMPLES 2 TO 10 OF DISPERSION STABILIZING RESINS (P-2 TO P-10)

The reaction was conducted in the same manner as described in Production Example 1 of Dispersion Stabilizing Resin P-1, except that the compounds shown in Table B were used for methyl methacrylate and macromonomer M-1, respectively, to produce each of the dispersion stabilizing resins. The weight average molecular weight of the resulting resins was in the range of from $3.0 \times 10^4$ to $9.0 \times 10^4$.

TABLE B

| Production Example of Resin | Dispersion Stabilizing Resin | Monomer (Corresponding to MMA) | Macro-monomer | Monomer/ Macro-monomer (wt/wt) |
|---|---|---|---|---|
| 2 | P-2 | Styrene | M-1 | 40/60 |
| 3 | P-3 | Styrene | M-1 | 50/50 |
| 4 | P-4 | Styrene | M-1 | 60/40 |
| 5 | P-5 | Styrene | M-4 | 50/50 |
| 6 | P-6 | Styrene | M-5 | 50/50 |
| 7 | P-7 | Styrene | M-3 | 70/30 |
| 8 | P-8 | MMA* | M-1 | 30/70 |
| 9 | P-9 | MMA | M-6 | 20/80 |
| 10 | P-10 | MMA | M-2 | 30/70 |

*MMA = methyl methacrylate

PRODUCTION EXAMPLE 1 OF COMPARATIVE DISPERSION STABILIZING RESIN (R-1)

Ten grams of methyl methacrylate, 90 g of stearyl methacrylate and 200 g of toluene were placed in a four-necked flask and heated at 80° C. for 1 hour. Then, 1 g of a polymerization initiator, 1,1'-azobis(1-cyclohexanecarbonitrile), was added thereto, followed by polymerization at 80° C. for 24 hours in the same manner as described in Production Example 1 of Dispersion Stabilizing Resin P-1. The polymerization product was reprecipitated in methanol in the same manner as in ,Production Example 1 to obtain a polymer. The polymer thus obtained was a random copolymer, and the weight average molecular weight thereof was $6.4 \times 10^4$.

PRODUCTION EXAMPLE 2 OF COMPARATIVE DISPERSION STABILIZING RESIN (R-2)

Comparative Dispersion Stabilizing Resin R-2 of a random copolymer was synthesized in the same manner as described in Comparative Production Example 1 of R-1, except that 50 g of styrene and 50 g of lauryl methacrylate were used in place of 10 g of methyl methacrylate and 90 g of stearyl methacrylate, respectively. The weight average molecular weight of the resin was $6.1 \times 10^4$.

PRODUCTION EXAMPLE 3 OF COMPARATIVE DISPERSION STABILIZING RESIN (R-3)

A mixed solution of 100 g of octadecyl methacrylate, 1.4 g of thioglycolic acid and 100 g of toluene was heated to a temperature of 70° C. with stirring under nitrogen stream. Then, 1.0 g of A.I.B.N. was added thereto, followed by reacting for 4 hours. The resulting reaction solution was cooled to room temperature, and 2.8 g of 2-hydroxyethyl methacrylate was added thereto. A mixed solution of 4.5 g of dicyclohexylcarbodiimide (abbreviated as D.C.C.) and 10 g of methylene chloride was added dropwise thereto over a period of 1 hour. Then, 0.1 g of 4-dimethylaminopyridine and 0.1 g of t-butylhydroquinone were added thereto, followed by stirring for 4 hours.

The precipitated crystals were removed by filtration to obtain a filtrate, which was then reprecipitated in 2 liters of methanol. The precipitated white solid was collected by decantation and dissolved in 300 ml of tetrahydrofuran. The solution was again reprecipitated in 3 liters of methanol to synthesize a comparative macromonomer. The comparative dispersion stabilizing resin R-3 was synthesized in the same manner as in Production Example 1 of P-1, except that the comparative macromonomer was used in place of macromonomer M-1. The yield of the resin was 94.2 g, and the weight average molecular weight thereof was $7.2 \times 10^4$.

PRODUCTION EXAMPLE 1 OF LATEX GRAINS (D-1)

A mixed solution of 10 g of Dispersion Stabilizing Resin P-1, 63.6 g of methyl methacrylate, 36.4 g of methyl acrylate and 400 g of Isopar H was heated to a temperature of 60° C. with stirring under nitrogen stream, and 2.6 g of 2,2'-azobis(2,4-dimethylvaleronitrile) was added thereto, followed by reacting for 4 hours. White turbidity appeared 10 minutes after the addition of the initiator, and the reaction temperature increased up to 93° C. The temperature was kept at 90° C., followed by stirring for 2 hours to remove the unreacted monomer by distillation. After cooling, the mixture was passed through a 200 mesh nylon cloth to obtain a white dispersion. This dispersion was a latex having a polymerization ratio of 96% and an average grain size of 0.21 μm. The white dispersion had a good dispersed state after storage of one month.

PRODUCTION EXAMPLES 2 TO 6 OF LATEX GRAINS (D-2) TO (D-7)

Each of the latex grains shown in Table C below was produced in the same manner as described in Production Example 1 of Latex Grains (D-1), except that each of the dispersion stabilizing resins shown in Table C was used in place of Dispersion Stabilizing Resin (P-1). The results obtained are shown in Table C. The polymerization ratio of each of the latex grains was in the range of from 85 to 95%.

TABLE C

| Production Example of Latex | Latex Particles | Dispersion Stabilizing Resin | Average Grain Size of Latex μm | Dispersed State* |
|---|---|---|---|---|
| 2 | D-2 | P-2 | 0.31 | Good |
| 3 | D-3 | P-3 | 0.28 | Good |
| 4 | D-4 | P-5 | 0.27 | Good |

TABLE C-continued

| Production Example of Latex | Latex Particles | Dispersion Stabilizing Resin | Average Grain Size of Latex μm | Dispersed State* |
|---|---|---|---|---|
| 5 | D-5 | P-6 | 0.30 | Good |
| 6 | D-6 | P-9 | 0.11 | Good |
| 7 | D-7 | P-10 | 0.08 | Good |

*Dispersed state after storage of 1 month

PRODUCTION EXAMPLES 1 TO 3 OF COMPARATIVE LATEX TRAINS (S-1) TO (S-3)

Each of the latex grains was produced in the same manner as in Production Example 1 of Latex Grains (D-1) except that each of the comparative dispersion stabilizing resins (R-1), (R-2) and (R-3) was used in place of Dispersion Stabilizing Resin (P-1). The results obtained are shown in Table D. The polymerization ratio of the respective latex grains was in the range of from 90 to 95%.

TABLE D

| Production Example of Comparative Latex | Latex Grains | Comparative Dispersion Stabilizing Resin | Average Grain Size of Latex μm | Dispersed State* |
|---|---|---|---|---|
| 1 | S-1 | R-1 | 4.01 | A large amount of precipitates |
| 2 | S-2 | R-2 | 5.52 | A large amount of precipitates |
| 3 | S-3 | R-3 | 0.20 | Good |

*Dispersed state after storage of 1 month

In comparison with latex grains (D-1) to (D-7) produced using the dispersion stabilizing resins for the present invention, latex grains (S-1) and (S-2) produced using comparative dispersion stabilizing resins (R-1) and (R-2) were large in grain size, and a large amount of precipitates was observed in the dispersed state. Accordingly, these latex particles could not be used for the liquid developer. Latex particles (S-3) produced using comparative dispersion stabilizing resin (R-3) were small in particle size and satisfactory in dispersion stability.

PRODUCTION EXAMPLES 8 TO 10 OF LATEX GRAINS (D-8) TO (D-10)

Each of the latex grains was produced in the same manner as in Production Example 1 of Latex Grains D-1) except that each of the monomer components shown in Table E was used in place of methyl methacrylate and methyl acrylate in Production Example 1. The results obtained are shown in Table E. The polymerization ratio of the respective latex grains was in the range of from 90 to 95%.

TABLE E

| Production Example of Latex | Latex Grains | Monomer Components | | Average Grain Size of Latex μm |
|---|---|---|---|---|
| 8 | D-8 | Methyl methacrylate 53.8 g | Methyl acrylate 46.2 g | 0.16 |
| 9 | D-9 | Methyl methacrylate 70.0 g | Methyl acrylate 30.0 g | 0.19 |
| 10 | D-10 | Methyl methacrylate | Methyl acrylate | 0.25 |

TABLE E-continued

| Production Example of Latex | Latex Grains | Monomer Components | | Average Grain Size of Latex μm |
|---|---|---|---|---|
| | | 66.6 | 33.4 g | |

EXAMPLE 1

Resin dispersion (D-1) produced in Production Example 1 of Latex Grains was diluted with Isopar H so as to give a resin content of 5 g/liter. Zirconium naphthenate was added thereto as a charge controlling agent to prepare a positive charge liquid developer, and, then, the charge amount of the resulting developer was measured.

The charge amount was measured using an equipment for measuring electrophoretic characteristics of liquid developer as described in JP-B-64-696. (The charge amount was measured by determining the initial differential calculus of the voltage variation with time induced on the back surface of the electrode at the applied voltage of 500 V).

COMPARATIVE EXAMPLE 1

Comparative Liquid Developer A was prepared in the same manner as described in Example 1 except that the resin dispersion (S-3) obtained in Production Example 3 of Comparative Latex Grains was used in place of the resin dispersion (D-1), and then, the charge amount of the resulting developer was measured.

The charge amounts of the liquid developer of the present invention and the comparative liquid developer are shown in Table F.

TABLE F

| Example | Liquid Developer | Dispersion Stabilizing Resin | Amount of Charge Controlling Agent (mol) | Charge Amount (mV) |
|---|---|---|---|---|
| 1-1 | Liquid developer of present invention | P-1 | $1 \times 10^{-6}$ | 47 |
| 1-2 | | P-1 | $1 \times 10^{-5}$ | 84 |
| 1-3 | | P-1 | $1 \times 10^{-4}$ | 129 |
| 1-4 | Liquid developer for Comparison | R-3 | $1 \times 10^{-6}$ | 7 |
| 1-5 | | R-3 | $1 \times 10^{-5}$ | 16 |
| 1-6 | | R-3 | $1 \times 10^{-4}$ | 20 |

The results shown in Table F show that the liquid developer of the present invention prepared by using the dispersion stabilizing resin mainly composed of the graft copolymer containing the specific macromonomer (M) obtained by bonding the double bond-containing epoxy compound to the specific polymer using a quaternary ammonium salt as a reaction catalyst provides chargeability to the toner particles, and the charge amount of the particles can also be easily controlled by the amount of the charge controlling agent without introduction of a chargeability imparting ingredient into the toner particles.

On the other hand, the results also show that the comparative liquid developer in which the dispersion stabilizing resin mainly composed of the graft copolymer containing the specific macromonomer (M) synthesized without using the quaternary ammonium salt as a reaction catalyst is used can not effectively provide chargeabiltiy to the toner particles and the charge amount can not be controlled.

EXAMPLE 2

A solution of dispersion stabilizing resin P-1 in Isopar H was added to a comparative developer in which no charge was provided to the toner particles, so as to give a resin content of 0.6 g/liter, and, then, the charge amount of the mixture was measured. The amount of zirconium naphthenate added as a charge controlling agent was $1 \times 10^{-4}$ mol. The charge amount measured was as large as 131 mV, which shows that the charge was effectively provided.

Examples 1 and 2 show that the chargeability can be provided to the toner particles and the charge amount of the particles can also be easily controlled by the amount of the charge controlling agent without introduction of a chargeability imparting ingredient into the toner particles by using the dispersion stabilizing resin mainly composed of the graft copolymer containing the specific macromonomer (M) obtained by bonding the double bond-containing epoxy compound to the specific polymer using the quaternary ammonium salt as the reaction catalyst on polymerization-granulation or by subsequently adding the dispersion stabilizing agent to the liquid developer.

EXAMPLES 3 TO 11

Liquid developers were prepared in the same manner as described in Example 1 except that latex particles shown in Table G were used in place of the white resin dispersion obtained in Production Example 1 of Latex Grains and an octadecene octadecylamide semi-maleate copolymer was added so as to give a concentration of 0.01 g/liter of Isopar H, and their charge amount was measured. The results obtained are shown in Table G.

TABLE G

| Example | Latex Grains | Charge Amount mV | Resolving Power lines/mm | Stain of Developing Apparatus | Stability of Developer* |
|---|---|---|---|---|---|
| 3 | D-2 | 86 | 36–39 | No stain | Good |
| 4 | D-3 | 73 | 38–42 | No stain | Good |
| 5 | D-4 | 78 | 37–40 | No stain | Good |
| 6 | D-5 | 84 | 38–42 | No stain | Good |
| 7 | D-6 | 95 | 34–40 | No stain | Good |
| 8 | D-7 | 92 | 35–39 | No stain | Good |
| 9 | D-8 | 110 | 34–36 | No stain | Good |
| 10 | D-9 | 101 | 36–40 | No stain | Good |
| 11 | D-10 | 89 | 35–39 | No stain | Good |

*Dispersed state after storage of 1 month

Using these developers, the following printing plate precursor positively charged with a corona charger was imagewise exposured and reverse developed according to a conventional method. The plate was heated at 120° C. for 10 minutes to fix the image.

This printing plate precursor was immersed in an etching solution prepared by diluting 40 parts of potassium silicate, 10 parts of potassium hydroxide, 20 parts of benzyl alcohol and 20 parts of ethanol with 900 parts of water to remove the non-image areas, and then sufficiently washed with water.

The resolving power of the resulting plate was measured, thereby evaluating the resist property of the toner image areas. Further, the above-described processing was conducted for 3000 plates to evaluate the stain of the developing apparatus due to adhesion of the toner. The results obtained are also shown in Table G.

As shown in Table G, the liquid developer of the present invention provides definite chargeability, and makes it easy to control the charge amount. Further, it exhibits excellent resist property and dispersion stability, and does not generate stains of the developing apparatus due to toner adhesion. Also, the image quality of the resulting printing plates is very clear the image of the prints at printing is very clear even after printing of 10000 prints.

Preparation of Printing Plate Precursor

An aluminum plate which had been subjected to sand graining and anodized was coated with the following coating solution for a photoconductive layer using a bar coater, and dried at 140° C. for 10 minutes. Thus, a plate having a coated film 3.0 μm in thickness was prepared.

Coating solution for Photoconductive Layer

|  |  | Parts by weight |
|---|---|---|
| 1. | X type metal-free phthalocyanine | 15 |
| 2. | Copolymer of benzyl methacrylate and methacrylic acid (methacrylic acid: 30 mol %) | 139 |
| 3. | Thiobarbituric acid derivative shown below | 1.6 |

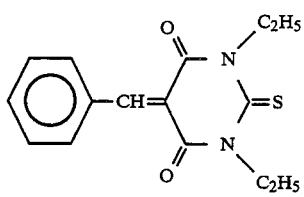

| 4. | 1-Methoxy-2-propanol | 444 |
| 5. | Methyl ethyl ketone | 666 |

The mixture having the above composition was uniformly dispersed by means of a DYNO MIL (KDL) (dispersion residence time: 1 hour) to prepare the photoconductive coating solution.

Viscosity of the coating solution: 90 cps (ELD viscometer).

According to the present invention, a liquid developer which provides a definite positive chargeability with easy control of the charge amount, and which has an excellent dispersion stability and resistance to the use and the storage over a long period of time can be obtained.

Further, a liquid dispersing agent which can form a toner image having a strong resist property to an etching solution can be obtained.

Furthermore, since the liquid developer of the present invention does not cause stains of the developing apparatus due to toner adhesion, the developer provides easy maintenance of the developing apparatus and excellent resolving power and image reproducibility.

While the invention has been described in detail and with reference to specific embodiments thereof, it will be apparent to one skilled in the art that various changes and modifications can be made therein without departing from the spirit and scope thereof.

What is claimed is:

1. A positively chargeable liquid developer for electrostaticphotography comprising a non-aqueous solvent having a volume specific resistance of at least $10^9$ Ωcm and resin grains dispersed therein, wherein said resin grains contain a dispersion stabilizing resin which is dissolved or dispersed in a colloidal form in said non-aqueous solvent and which mainly comprises a graft copolymer composed of (1) at least one macromonomer (M) having a weight average molecular weight of from $1 \times 10^3$ obtained by bonding a terminal carboxyl group bonded to the main chain of a polymer containing at least one polymer component represented by the following general formula (I) to an epoxy compound having at least one polymerizable double bond group, using a quaternary ammonium salt as a reaction catalyst, said at least one macromonomer containing said quaternary ammonium salt, and (2) at least one monomer represented by the following general formula (II):

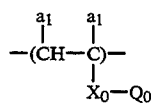  (I)

wherein $X_0$ is selected from the group consisting of

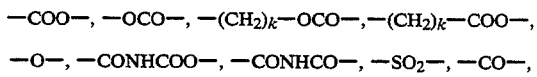

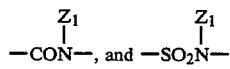

(wherein $Z_1$ is selected from the group consisting of a hydrogen atom and a hydrocarbon group, and k represents an integer of 1 to 3); $a_1$ and $a_2$, which may be the same or different, each is selected from the group consisting of a hydrogen atom, a halogen atom, a cyano group, a hydrocarbon group, $-COO-Z_2$ and $-COO-Z_2$ bonded via a hydrocarbon group is selected from the group consisting of a hydrogen atom and a hydrocarbon group which may be substituted); and $Q_0$ represents an aliphatic group having from 4 to 22 carbon atoms;

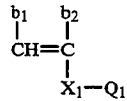  (II)

wherein $X_1$ is selected from the group consisting of

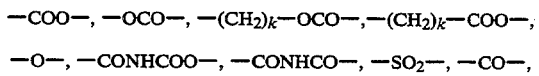

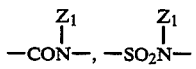

and a phenylene group (wherein $Z_1$ is selected from the group consisting of a hydrogen atom and a hydrocarbon group, and k represents an integer of from 1 to 3); $Q_1$ is selected from the group consisting of a hydrogen atom, an aliphatic group having from 1 to 22 carbon atoms and an aromatic group having from 6 to 12 carbon atoms; and $b_1$ and $b_2$, which may be the same or different, have the same meanings as $a_1$ and $a_2$ defined in the general formula (I).

2. The positively chargeable liquid developer for electrostaticphotography as claimed in claim 1, in which said resin grains are obtained by polymerizing a monomer which is soluble in said non-aqueous solvent but which becomes insoluble after being polymerized, in the presence of a dispersion stabilizing resin which is soluble or dispersed in a colloidal form in said non-aqueous solvent, and which comprises a graft copolymer composed of (1) at least one macromonomer (M) having a weight average molecular weight of from $1 \times 10^3$ to $1 \times 10^5$ obtained by bonding a terminal carboxyl group bonded to main chain of a polymer containing at least one polymer component represented by the general formula (I) to an epoxy compound having at least one polymerizable double bond group, using a quaternary ammonium salt as a reaction catalyst, and (2) at least one monomer represented by the general formula (II).

3. The positively chargeable liquid developer for electrostaticphotography as claimed in claim 1, wherein said phenylene group is selected from the group consisting of a 1,2-phenylene group, a 1,3-phenylene group and a 1,4-phenylene group.

4. The positively chargeable liquid developer for electrostaticphotography as claimed in claim 1, wherein the hydrocarbon group represented by $Z_1$ is selected from the group consisting of an alkyl group having from 1 to 22 carbon atoms which may be substituted, an alkenyl group, an aralkyl group, an alicyclic group, an aryl group having from 1 to 22 carbon atoms which may be substituted and a cross-linked hydrocarbon group having from 5 to 18 carbon atoms.

5. The positively chargeable liquid developer for electrostaticphotography as claimed in claim 1, wherein the hydrocarbon group represented by $a_1$, $a_2$, $b_1$ and $b_2$ is an alkyl group having from 1 to 3 carbon atoms.

6. The positively chargeable liquid developer for electrostaticphotography as claimed in claim 1, wherein the hydrocarbon group represented by $Z_2$ is selected from the group consisting of an alkyl group having from 1 to 18 carbon atoms, an alkenyl group having from 2 to 18 carbon atoms, an aralkyl group having from 7 to 18 carbon atoms, an alicyclic group having from 3 to 18 carbon atoms and an aryl group having from 6 to 18 carbon atoms which may be substituted.

7. The positively chargeable liquid developer for electrostaticphotography as claimed in claim 1, wherein the aliphatic group represented by $Q_0$ is an alkyl group having from 1 to 22 carbon atoms which may be substituted.

8. The positively chargeable liquid developer for electrostaticphotography as claimed in claim 1, wherein said epoxy compound having at least one polymerizable double bond group is selected from the group consisting of glycidyl methacrylate and glycidyl acrylate.

9. The positively chargeable liquid developer for electrostaticphotography as claimed in claim 1, wherein said quaternary ammonium salt is represented by $R_1R_2R_3R_4N^+X^-$, wherein $R_1$, $R_2$, $R_3$, and $R_4$ each is selected from the group consisting of an alkyl group having from 1 to 32 carbon atoms which may be substituted; an alkenyl group having from 3 to 32 carbon atoms which may be substituted; an aralkyl group having from 7 to 36 carbon groups which may be substituted; an alicyclic hydrocarbon group having from 5 to 32 carbons which may be substituted; an aryl group having from 6 to 38 carbon atoms which may be substituted; and a heterocyclic group having at least 5 carbon atoms; $R_1$, $R_2$, $R_3$ and $R_4$ may be the same or different, two of $R_1$, $R_2$, $R_3$ and $R_4$ may be linked together, and may have intervening 1 to 4 hetero atoms, and may further contain 0 to 6 double bonds and may form a mononuclear or polynuclear cyclic compound containing from 4 to 12 carbon atoms which is substituted by a halogen atom, an alkyl group having from 1 to 6 carbon atoms, an alkoxy group having from 1 to 6 carbon atoms, a hydroxyl group, an nitro group or an amino group; X represents an organic or inorganic anion; with the proviso that $R_1$ to $R_4$ may be substituted by —COO$^-$ or —SO$_3^-$, and in this case, X$^-$ need not be present.

10. The positively chargeable liquid developer for electrostaticphotography as claimed in claim 9, wherein X$^-$, is selected from the group consisting of anions of halogen atoms, PF$_6^-$, sulfates, phosphates, cyanates, thiocyanates, BF$_4^-$, B(aryl)$_4^-$, phenylates, nitrophenylates, saturated or unsaturated carboxylates or aromatic carboxylates, and sulfonates.

11. The positively chargeable liquid developer for electrostaticphotography as claimed in claim 9, wherein said quaternary ammonium salt is selected from the group consisting of tetramethylammonium chloride, tetramethylammonium p-toluenesulfonate, tetramethylammonium tetraphenylborate, tetraethylammonium bromide, tetraethylammonium salicylate, tetra-n-propylammonium bromide, tetrabutylammonium chloride, tetrabutylammonium phenylsulfonate, tetraoctylammonium iodide, cetyltrimethylammonium chloride, cetyldimethylammonium bromide, benzyltrimethylammonium chloride, butylpyridinium bromide, laurylpyridinium bromide, cetylpyridinium chloride, 1-hexadecylpyridinium chloride and 2-dodecylisoquinolium bromide.

12. The positively chargeable liquid developer for electrostaticphotography as claimed in claim 1, wherein said epoxy compound is added in an amount of from 0.9 to 3.0 times molar equivalent to that of carboxyl groups in reaction solution.

13. The positively chargeable liquid developer for electrostaticphotography as claimed in claim 1, wherein said quaternary ammonium salt as a reaction catalyst is added in an amount of from 0.1 to 5.0% by weight based on total amount of reaction solution.

14. The positively chargeable liquid developer for electrostaticphotography as claimed in claim 1, wherein said reaction catalyzed by said quaternary ammonium salt is carried out at a temperature of from 50° to 200° C.

15. The positively chargeable liquid developer for electrostaticphotography as claimed in claim 1, wherein said graft copolymer contains at least one other monomer which is copolymerizable with the monomer represented by general formula (II).

16. The positively chargeable liquid developer for electrostaticphotography as claimed in claim 15, wherein said at least one other monomer is selected from the group consisting of acrylonitrile, methacrylonitrile, acrylamide, methacrylamide, hydroxyethyl methacrylate, dialkylaminoethyl methacrylates, styrene, chlorostyrene, bromostyrene, vinylnaphthalene, polymerizable double bond group-containing heterocyclic compound, unsaturated carboxylic acids, itaconic anhydride and maleic anhydride.

17. The positively chargeable liquid developer for electrostaticphotography as claimed in claim 1, wherein said graft copolymer contains at least one polar group bonded to only one terminal of the main chain of the polymer.

18. The positively chargeable liquid developer for electrostaticphotography as claimed in claim 17, wherein said at least one polar group is selected from the group consisting of —PO$_3$H$_2$, —SO$_2$H, —COOH, —OH, —SH, —(Z$_0$)P(O)OH (wherein Z$_0$ represents —A$_0$ or —OZ$_{10}$, wherein Z$_{10}$ represents a hydrocarbon group), formyl and amino.

19. The positively chargeable liquid developer for electrostaticphotography as claimed in claim 18, wherein said hydrocarbon group represented by Z$_{10}$ has from 1 to 18 carbon atoms and is selected from the group consisting of an aliphatic group having from 1 to 8 carbon atoms which may be substituted and an aromatic group which may be substituted.

20. The positively chargeable liquid developer for electrostaticphotography as claimed in claim 1, wherein said dispersion stabilizing resin is used in an amount of from 1 to 100 parts by weight per 100 parts by weight of the total amount of the monomers.

* * * * *